June 14, 1960  J. W. GASKELL  2,940,672
TRAVELING SPRINKLER SYSTEM
Filed Oct. 29, 1957  2 Sheets-Sheet 2
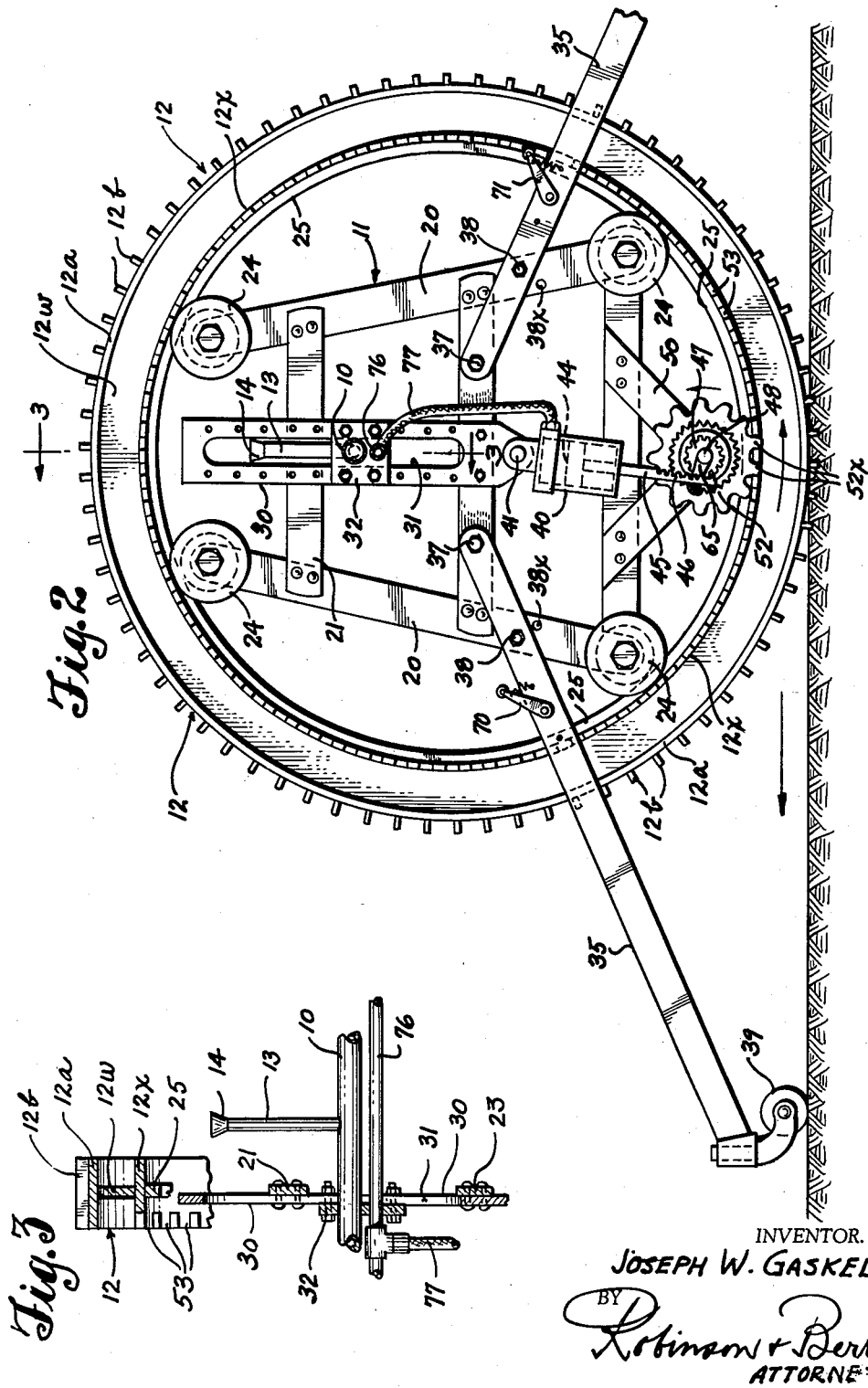
INVENTOR.
JOSEPH W. GASKELL
BY
Robinson & Berry
ATTORNEYS

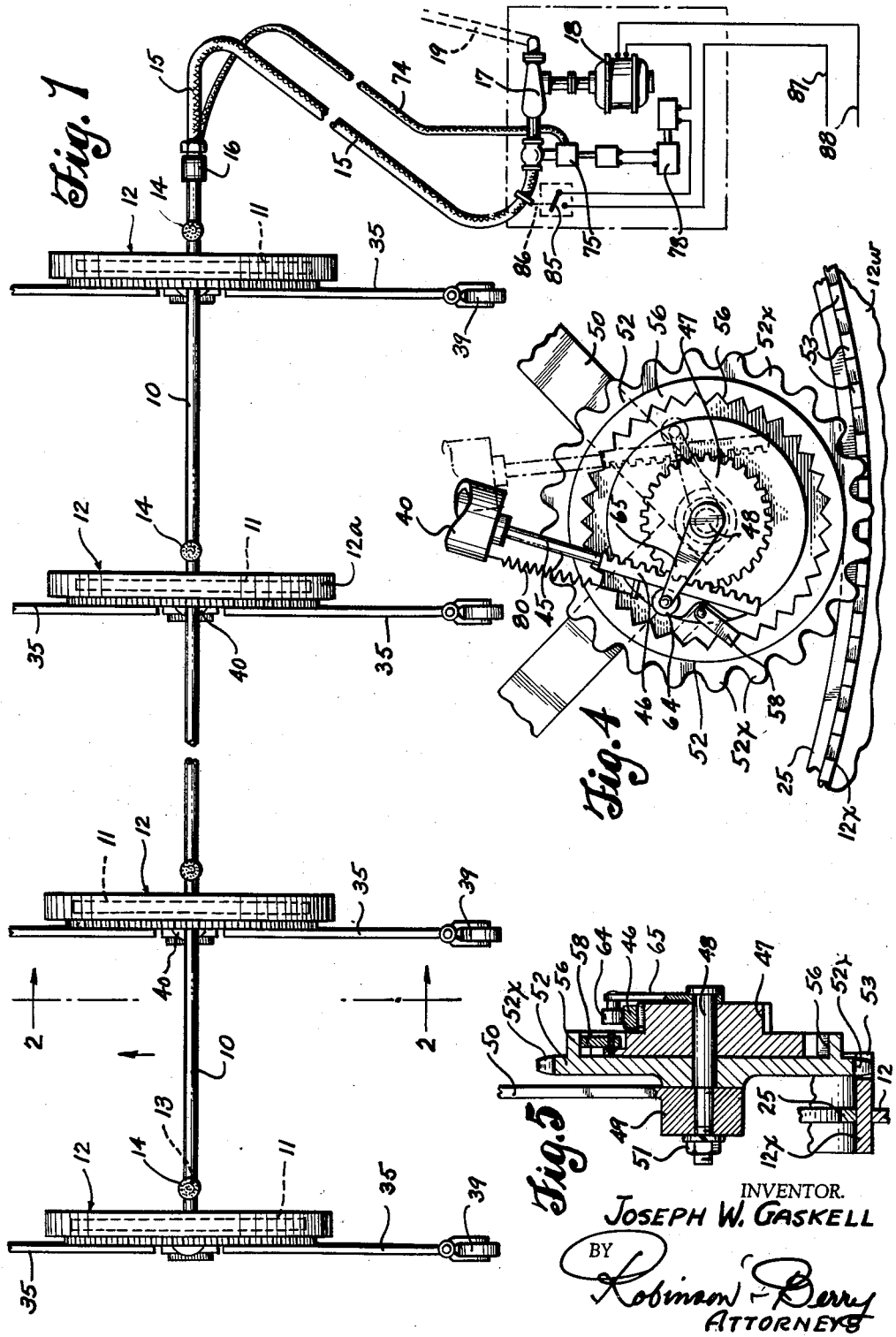

United States Patent Office 2,940,672
Patented June 14, 1960

2,940,672

TRAVELING SPRINKLER SYSTEM

Joseph W. Gaskell, 1960 Snyder St., Bremerton, Wash.

Filed Oct. 29, 1957, Ser. No. 693,177

5 Claims. (Cl. 239—212)

This invention relates to sprinkler systems as employed for crop irrigation or land watering purposes. More particularly it has reference to certain improvements in what are generally designated as "traveling sprinkler systems."

It is the principal object of this invention to provide a traveling sprinkler system comprising an elongated, substantially straight water main, equipped at predetermined intervals therealong with spray or sprinkler heads, and supported for travel in directions laterally of the main across a designated area by means of relatively large ground wheels located at predetermined intervals along the main; each wheel having an individual, hydraulically powered driving means to which the powering medium is periodically applied under control of a suitable timer that is common to all wheels, thus to cause them to be turned to the same extent and in unison for the intermittent advancement of the system across the area.

It is also an object of this invention to provide a traveling sprinkler system of the character above recited in which provision is made for reversing its direction of travel across any designated area and wherein the extent of its travel in opposite directions may be limited by the length of hose that conducts the water for irrigation to the main of the sprinkler system.

It is also an object of the present invention to provide for automatically stopping the travel of the system and the delivery of water thereto when it reaches its limit of travel in either direction.

Yet another object of the invention is to provide a traveling sprinkler system employing hydraulic cylinders for driving the ground wheels on which the system travels, and to provide a supply line for the delivery of water under pressure simultaneously to the several cylinders; this supply line being separate from the water main and placed under control of a valve and a timing means therefor that can be regulated to cause the advancement of the system at any predetermined rate of travel.

Still further objects and advantages reside in the details of construction of the various parts of the system as associated with the water main for its support and controlled rate of travel, and in their relationship and mode of operation as will hereinafter be fully described.

In accomplishing the above mentioned and other objects and advantages of the invention, I have provided the improved details of construction the preferred forms of which are illustrated in the accompanying drawings, wherein:

Fig. 1 is a plan or top view of a traveling sprinkler system embodying the improvements of the present invention therein; the medial portions of both the water main and the supply hose lines leading thereto being broken away to reduce the size of the view.

Fig. 2 is an enlarged cross-sectional view, taken in the vertical plane of line 2—2 in Fig. 1, particularly showing one of the main supporting ground wheels, its driving cylinder and direction control means.

Fig. 3 is a sectional detail taken on line 3—3 in Fig. 2.

Fig. 4 is an enlarged elevation of the ground wheel driving gearing shown in Fig. 2 and indicating in dotted lines, the direction reversing positions of certain parts associated with the gearing.

Fig. 5 is a sectional view taken through the wheel driving gearing on line 5—5 in Fig. 4.

Referring more in detail to the drawings:

In Fig. 1, the intermediate portion of the traveling system has been broken away and the end portions have been moved closer together in order to shorten the view and thus permit the shown parts to be illustrated at a scale that can be better understood. It is practical and desirable that systems of this character be made of such length as to extend across a field or area of substantial width, and to provide for travel of the system in opposite directions thereacross. The water main through which water is supplied to the sprinklers' heads would ordinarily be from two to four inches in diameter depending on its length and number of sprinklers used. The supporting wheels, which may be from six to eight feet in diameter, would be spaced therealong as may be required to best suit the system and field conditions. It is not the intent that the various parts of the system be limited to any specific dimensions.

In its present preferred combination and arrangement of parts, a water main 10 of a desired length and generally made up of a plurality of aluminum pipe sections joined end to end, is supported at predetermined intervals therealong by rigid frames 11, through which the main extends, and about which frames supporting ground wheels 12 are mounted for rotation.

All wheels 12 are of the same diameter and are held substantially in parallel relationship by the frames 11 about which they turn. All wheels 12, as presently explained, are periodically rotatably advanced, in unison and to the same extent, to carry the main by intermittent movements, laterally across the area to be watered; this movement being effected by hydraulically powered means presently to be described in detail.

As shown in Fig. 1, the water main 10 is equipped at regular intervals therealong with upright discharge pipes 13 of relatively small diameter which, at their upper ends, are equipped with spray or sprinkler heads 14. These heads may be of any kind practical or suitable for the operation.

Water is supplied to the main 10 through an elongated, light weight flexible hose or conduit 15; this being connected to one end of the main by a swivel type fitting designated in Fig. 1 at 16. Water is supplied to the hose 16 by a pressure pump 17 located at one edge of the area to be watered midway of the end limits between which the system travels. The pump is driven by an electric motor 18. Water can be supplied to the pump from any suitable source such as, for example, a reservoir, well or stream through a pipe connection 19.

Each of the water main supporting frames 11 is disposed transversely of the main and the main passes horizontally therethrough. Preferably each frame is constructed as shown in Fig. 2 wherein 20—20 designates laterally spaced vertically directed opposite side bars of the same length, joined rigidly in laterally spaced relationship by upper bars 21, a lower bar 22 and an intermediate bar 23. At their upper and lower ends, the side bars 20—20 have flanged rollers 24 rotatably mounted thereon and it is about these that the ground wheel 12 is mounted for rotation. The wheels 12 are all of the same diameter, which is sufficient to insure their easy rolling on the surface.

Each wheel 12 comprises a flat outer rim or tire portion 12a that preferably is equipped with suitable traction cleats 12b as seen in Fig. 2; this rim being supported from and concentrically of an inside ring 12x by a web 12w. The ring 12x travels about the corresponding frame 11 in rolling contact with its four rollers 24. It is equipped circumferentially with an internal guide flange 25 which is received between the spaced flanges of the rollers 24 as has been shown in Fig. 2, to retain the ground wheel in proper position on the frame.

Fixed to each frame 11, in the central plane thereof, is a vertical and rather elongated plate 30 formed substantially to its full length with a slot 31, and associated with each plate and extending across the slot therein, is a water main supporting plate 32. The water main extends horizontally through the slots of the plates 30 of all frames 11 and through the plates 32. The plates 30 and 32 are so equipped that the latter may be adjusted to various positions along the slots 31 and there secured, thus to support the main at the desired elevation above the ground level. It is shown in Figs. 2 and 3 that the plate 32 is bolted to the plate 30 at the desired elevation.

In order to prevent the frames 11 from rotating with the wheels 12 and to retain them properly in the desired upright position as the system is advanced across an area, each frame is equipped with forwardly and rearwardly directed stabilizing arms 35; each arm being pivotally fixed at its inner end to the cross-bar 23 of the frame, as at 37 in Fig. 2, and having a fixed bolt connection, as at 38 with the corresponding upright bar 20 of the frame. The bars 20 are each formed with a series of holes 38x to receive the bolts 38 so that the latter points of connection may be vertically adjusted for obtaining the desired elevation of the outer end of each arm. Each brace arm 35 is equipped at its outer end with a caster wheel 39 for easy rolling contact with the ground surface.

It is the intent that when the system is moving in either direction across the field, the stabilizing arms which are then at the forward side will be in such adjustment that their casters will be in rolling contact with the ground and those of arms at the trailing side will normally be slightly above ground.

The means employed for propelling the main carrying wheels 12 comprises, for each wheel, a hydraulic motor comprising a cylinder 40 that is located below the main 10 and is pivotally attached at its upper end, as at 41 in Fig. 2, to the lower end of the plate 30 of the corresponding wheel mounting frame 11. The cylinder 40 is equipped with a piston 44 from which a piston rod 45 extends in a downward direction. Formed as a continuation of the piston rod is a rack 46 which is held in operative mesh with a pinion gear wheel 47 as shown in Fig. 4. The gear 47 is mounted for rotation on a horizontal stub shaft 48 that is mounted at one end in a bearing 49 carried by a bracket 50 that is fixed to and which extends downwardly from the lower cross-member 22 of the wheel mounting frame, as has been shown in Fig. 2. This stub shaft is secured in the bearing 49 by a nut 51 as shown in Fig. 5.

Mounted for rotation on shaft 48 at the inside of and closely adjacent the gear 47, is a somewhat larger gear 52 that is formed with peripheral teeth 52x adapted to operatively mesh with teeth 53 formed along the adjacent edge of the inner flange 12x of the corresponding wheel 12. Integral with gear 52, and also coaxially thereof, and of lesser diameter, is an internal ring gear 56; the teeth of this ring gear being of two way ratchet type as best shown in Fig. 4. A pawl 58 is pivotally mounted on gear 47 for operative engagement with the ratchet teeth for driving the gear 52. It is shown in Fig. 4 that the pawl 58, as mounted by gear 47, is reversible in direction. This is to adapt it for driving the gear 52 in opposite directions, according to its setting. Also, it is indicated in Fig. 4 that the position of the rack bar 46 is reversible in its application to gear 47 in order that it can drive the gear in opposite directions according to its positioning.

The rack bar 46, which is an extension of the piston rod of the hydraulic cylinder, is adapted when applied, in either position, to the gear 47, to be held in operative mesh with its gear teeth, by an over riding roller 64 carried on an arm 65 that is swingingly mounted on the outer end of stub shaft 48 as shown in Figs. 4 and 5. To reverse the setting of parts as required for reversing the direction of travel of the sprinkler system, the securing nut 51 that is applied to the inner end of stub shaft 48, is first removed and the shaft withdrawn sufficiently to permit disengaging the roller 64 from its holding relationship with the rack bar. The bar is then axially rotated 180° and is swung, by movement of cylinder 40, to a position permitting it to be operatively applied to the opposite side of gear 47 as indicated by the dotted line showing in Fig. 4. Then the arm and roller are swung to their holding position, and the shaft 48 again secured in place by nut 51. Also, during this adjustment, the pawl 58 is reversed in its direction as required to drive wheel 52 in the opposite direction. With the driving means for all wheels 12 set in the same manner, outward reciprocating movements of the piston rods of the several cylinders in unison will cause all wheels 12 to be advanced in unison in the same direction and to the same extent.

In order that the wheels 12 if moving up an incline, may not roll back from any position of advancement when the rack bars are being retracted, spring pressed pawls as at 70 and 71 in Fig. 2, are mounted on the two thrust arms 35 and may be selectively set in position to engage with the teeth 53 of the ring 12x as a holding means.

The several hydraulic cylinders 40 are supplied with operating hydraulic pressure medium through a hose 74 leading from a control valve 75 located at the pump station and through which the discharge side of the pump is connected to the hose line 15. The hose 74 leads to one end of a pipe line 76 that extends closely along and parallel to the water main 10 through the various frames 11 as seen in Fig. 3. From pipe 76, short flexible conduits 77 lead to the upper ends of the hydraulic cylinders as noted in Fig. 2. The valve 75 is periodically operated from a closed to an open position by an electric timing device 78 of any suitable kind. When the valve is open, the hydraulic pressure medium is applied to the pipe line 76 and from this to the cylinders 40 and all piston rods are moved to their extended positions, thus to simultaneously cause the rotatable advancement of all wheels 12. When the valve 75 closes, springs 80, which are attached under tension to the cylinders and the rack bars, as seen in Fig. 4, to retract the piston rods and rack bars and move the pistons to the upper ends of their respective cylinders preparatory to the next advancement. When the valve 75 closes against admittance of the hydraulic medium under pressure from the pump to pipe 74, it opens a discharge port in the valve to atmosphere and allows the pressure medium to be exhausted from the cylinders, through pipe 76 and hose 74 and permits their pistons to be returned to their inner positions under influence of the springs 80. This places them in positions ready for the next advancing operation. The timer 78, however, does not stop the pump or its delivery of water under pressure from the pump to the water main 10; this being accomplished by other means which takes effect only when the system reaches the end of travel in either direction.

The extent of travel of the system in opposite directions is governed by the length of the hose 15 which will be drawn along the ground with the traveling system. When the hose is drawn taut the mounting end portion thereof is laterally flexed. This flexing operates to open a circuit control switch 85 for the electric motor 18 and thus to stop it. In Fig. 1 the switch lever is shown to have an operating connection at 86 with the hose. Circuit lines which supply current to the motor are designated at 87 and 88. These lines also supply current to operate the timer 78 and valve 75 which is normally closed.

In using the system assuming it to be at one end of a field, the hose is drawn back sufficiently to permit the switch 85 to be closed. This starts the motor and causes the pump 17 to supply water to the main 10 under pressure. The timer, being in operation in due time energizes the solenoid valve 75 which opens to admit pressure medium through pipe 76 to the cylinders 40 thus to laterally advance the system. With the parts adjusted to positions as in Fig. 2, the travel would be to the left. When the valve 75 closes to line 74 it opens to atmosphere and the pistons are retracted. This operation is periodically repeated for the intermittent advancement of the system across the area. When the system has crossed the area and the hose 15 again draws taut it opens switch 85 and again the pump is stopped thus to stop advancement of the system. The attendant then reverses the setting of pawls and rack bars, and the system is again ready for operation.

It is to be understood that the proportionate sizes of various parts of the apparatus as shown may be changed as need be to suit field conditions. For example, the diameter of the wheels 12 may be increased or decreased; the spacing of wheels 12 along the pipe line also may be increased or decreased, and it is anticipated that the wheels 39, herein shown to be of rather small diameter, may be increased to such diameter as may be required to insure their easy travel over the ground surface.

It is further to be explained that where extra large areas are to be covered, hydraulic supply lines could be extended from the pump to various stations along the field and the supply lines 15 and 74 connected thereto at these stations. In this arrangement, the starting and stopping of the electric motor would be through suitable low voltage control devices.

What I claim as new is:

1. In combination with a source of supply of water under pressure, a traveling sprinkler system comprising a water delivery main, a wheel mounting frame fixed to and about said main, an annular ground wheel mounted on and rotatable about said frame for support and lateral travel of said main, stabilizing means fixed to said wheel frame and extended laterally therefrom for travel contact with the ground to prevent axial turning movement of the main, in travel, a hydraulic motor supported on said wheel mounting frame and operatively connected with said ground wheel for its rotation, a water supply pipe line extended along said main in fixed relation thereto and connected with said hydraulic motor for its operation, a flexible conduit connecting said source of supply of water with said main, another flexible conduit connecting said source of supply of water with said pipe line to serve said hydraulic motor, and a control means that is common to both water connections, operable by flexing movement of one of said flexible conduits incident to a predetermined lateral travel of said water delivery main to effect a discontinuance of the water supply to said main and pipe line and effect the venting of water under pressure from said pipe line.

2. The combination recited in claim 1 wherein a solenoid valve operable by a timing means operates to periodically and alternately admit water under pressure from said source of supply through said pipe line to the hydraulic motor and to vent the pipe line to atmosphere for the intermittent driving of the hydraulic motor to effect intermittent lateral travel of the system.

3. The combination recited in claim 2 wherein the delivery of water under pressure to said main and pipe line is effected through a pump, driven by an electric motor and said motor has a circuit controlling switch that is operable, from closed to open position, by an operating connection with one of said flexible conduits.

4. The combination recited in claim 2 wherein the hydraulic motor comprises a pivotally mounted cylinder, a piston operable therein and a piston rod extended from the piston and cylinder having a reversible one-way driving connection with the ground wheel; said piston rod being extendable under pressure of water delivered to the motor from said source of supply and is retractable by spring means during periods when said valve is closed.

5. The combination recited in claim 2 wherein the driving connection between hydraulic motor and ground wheel includes a toothed wheel driving ring fixed concentrically to the wheel and wherein said stabilizing means comprises arms pivoted on and extended laterally in opposite directions from the wheel mounting frame; each arm being equipped with a ratcheting pawl and said pawls being adapted to be selectively engaged with the toothed ring to prevent turning of the wheel in a direction reverse to that in which it is being driven by the hydraulic motor.

References Cited in the file of this patent

UNITED STATES PATENTS

| | | |
|---|---|---|
| 2,582,416 | Cornelius | Jan. 15, 1952 |
| 2,665,169 | Tipton | Jan. 5, 1954 |
| 2,726,895 | Behlen | Dec. 13, 1955 |
| 2,796,292 | Maggart | June 18, 1957 |